US011858275B2

(12) United States Patent
Fukui et al.

(10) Patent No.: US 11,858,275 B2
(45) Date of Patent: Jan. 2, 2024

(54) INKJET PRINTING APPARATUS, AND A METHOD OF MAINTAINING A FILTER THEREOF

(71) Applicant: SCREEN HOLDINGS CO., LTD., Kyoto (JP)

(72) Inventors: Tamio Fukui, Kyoto (JP); Yuichi Nagase, Kyoto (JP); Masaki Kato, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 5 days.

(21) Appl. No.: 17/677,104

(22) Filed: Feb. 22, 2022

(65) Prior Publication Data

US 2022/0288942 A1 Sep. 15, 2022

(30) Foreign Application Priority Data

Mar. 12, 2021 (JP) ................................ 2021-040196

(51) Int. Cl.
*B41J 2/175* (2006.01)

(52) U.S. Cl.
CPC ....... *B41J 2/17563* (2013.01); *B41J 2/17596* (2013.01)

(58) Field of Classification Search
CPC ...... B41J 2/17596; B41J 2/17563; B41J 2/18; B41J 2/175
See application file for complete search history.

(56) References Cited

U.S. PATENT DOCUMENTS

| | | | |
|---|---|---|---|
| 8,356,867 B2 * | 1/2013 | Lee | B41J 2/17596 347/92 |
| 10,913,284 B2 | 2/2021 | Tanoue et al. | |
| 2005/0018003 A1 | 1/2005 | Norigoe | |
| 2008/0273070 A1 | 11/2008 | Mun et al. | |
| 2009/0244131 A1 | 10/2009 | Shibata | |
| 2012/0044303 A1 | 2/2012 | Park | |
| 2020/0276823 A1 | 9/2020 | Thomas et al. | |

FOREIGN PATENT DOCUMENTS

| | | |
|---|---|---|
| JP | 2002-200771 A | 7/2002 |
| JP | 2006-088492 A | 4/2006 |
| JP | 2008-132630 A | 6/2008 |
| JP | 2019-195967 A | 11/2019 |

OTHER PUBLICATIONS

Extended European Search Report issued in corresponding European Patent Application No. 22160511.6-1014, dated Jul. 19, 2022.

* cited by examiner

*Primary Examiner* — An H Do
(74) *Attorney, Agent, or Firm* — Rimon P.C.

(57) ABSTRACT

An inkjet printing apparatus performs printing on a printing medium by feeding ink to an inkjet head having a plurality of nozzles and dispensing the ink from the inkjet head to the printing medium. The apparatus includes a tank, a supply pipe communicatively connecting the tank and the inkjet head, a pump for feeding the ink stored in the tank to the inkjet head, a filter disposed on a path of the supply pipe, and a controller for operates the pump and controlling feeding of the ink. The controller operates the pump to engage in forward drive in time of printing operation, and operates the pump to engage in backward drive in time of functional recovery operation.

9 Claims, 6 Drawing Sheets

| STILL TIME[min] | FLOW RATE DECREASE RATE[%] | BACKFLOW RATE[ml] |
|---|---|---|
| 10 | 0 | 0 |
| 30 | 1 | 15 |
| 40 | 2 | 30 |
| 60 | 4 | 60 |
| 600(10HOURS) | 10 | 100 |
| 1440(24HOURS) | 15 | 150 |
| 14400(10DAYS) | 36 | 360 |
| 43200(1MONTH) | 52 | 520 |
| 129600(3MONTH) | 75 | 750 |

INKJET PRINTING APPARATUS, AND A METHOD OF MAINTAINING A FILTER THEREOF

BACKGROUND OF THE INVENTION

(1) Field of the Invention

This invention relates to an inkjet printing apparatus for performing printing by dispensing ink to a printing medium, and a method of maintaining a filter thereof.

(2) Description of the Related Art

Conventionally, this type of apparatus includes a main tank, a pump, a filter, a subtank, a head, and a supply pipe. See Japanese Unexamined Patent Publication No. 2019-195967, for example.

The main tank stores ink for forming images. The supply pipe communicatively connects the main tank and the head, and has the pump, filter, and subtank arranged thereon in this order. The pump supplies the ink from the main tank to the subtank through the filter. The subtank supplies the ink to the head. The filter removes, for example, particles having mixed in at times of ink replenishing operation for the main tank, and particles having generated from connecting locations or movable parts of the supply pipe, such particles not contributing to image formation, but causing choking of the head.

However, the conventional example with such a construction has the following problem.

That is, the ink used in the inkjet printing apparatus, if it is UV ink which is dried by UV light, is composed of dispersed ingredients such as pigment, dispersant, and monomer. If it is water pigment ink which is dried by heat, it is composed of ingredients such as pigment, dispersant, stabilizer, and water. The filter captures, for example, loosely flocculated masses particularly of the pigment and monomer among these ingredients, and these masses can block the filter. Consequently, the conventional apparatus may require an unnecessarily shortened filter change time due to such flocculated masses of ink ingredients rather than the particles which should intrinsically be removed. This poses a problem that the high filter changing frequency raises operation cost.

SUMMARY OF THE INVENTION

This invention has been made having regard to the state of the art noted above, and its object is to provide an inkjet printing apparatus and a method of maintaining a filter thereof which can reduce operation cost due to changing of the filter by improving blocking of the filter.

To fulfill the above object, this invention provides the following construction.

An inkjet printing apparatus, according to this invention, performs printing on a printing medium by feeding ink to an inkjet head having a plurality of nozzles and dispensing the ink from the inkjet head to the printing medium. The apparatus comprises a tank for storing the ink; a supply pipe communicatively connecting the tank and the inkjet head; a pump mounted on the supply pipe for feeding the ink stored in the tank to the inkjet head; a filter disposed on a path of the supply pipe; and a controller for operating the pump and controlling feeding of the ink; wherein the controller is configured to operate the pump to engage in forward drive for feeding the ink from the tank toward the inkjet head in time of printing operation that causes the inkjet head to dispense the ink fed from the tank, and to operate the pump to engage in backward drive for feeding the ink from a position downstream of the pump back to the tank in time of functional recovery operation for improving choking of the filter.

According to this invention, the controller provides the forward drive of the pump for feeding the ink from the tank toward the inkjet head in time of printing operation. The controller provides the backward drive of the pump for feeding the ink from a position downstream of the pump back to the tank in time of functional recovery operation. This can re-disperse, in the ink within the supply pipe, masses of ingredients of the ink captured by the filter during the printing operation. The choking of the filter can thereby be improved, which can reduce operation cost due to changing of the filter. As a result, the filter can be used to the best advantage for its intrinsic purpose of removing particles that do not contribute to image formation, but cause choking of the inkjet head.

In this invention, it is preferred that the apparatus further comprises a degassing filter mounted on the supply pipe between the pump and the inkjet head and downstream of the filter for removing bubbles from the ink; wherein the controller is configured to operate the pump to engage in the backward drive, in time of functional recovery operation, until an interface between the ink and gas in a portion of the supply pipe adjacent the inkjet head is located on a side of the degassing filter adjacent the inkjet head.

The controller, in time of functional recovery operation, provides the backward drive until the interface between the ink and gas in the portion of the supply pipe adjacent the inkjet head is located on the side of the degassing filter adjacent the inkjet head. Consequently, the interface between the ink and gas is not located in the degassing filter. The degassing filter can therefore remain filled with the ink during the functional recovery operation. This prevents the bubbles mixing into the ink.

In this invention, it is preferred that the controller is configured to repeat the forward drive and the backward drive a plurality of times in time of functional recovery operation.

The controller, in time of functional recovery operation, repeats the forward drive and backward drive two or more times. Consequently, the ink in the supply pipe can fully be agitated through the filter. The masses of the ingredients of the ink captured by the filter can therefore be re-dispersed reliably.

In this invention, it is preferred that the controller is configured to provide the backward drive based on a relationship between a still time which is a duration of a state where the ink is not flowing, and an ink backflow amount necessary for re-dispersing ingredients captured by the filter.

There is a certain correlation between the still time and the ink backflow amount necessary to the re-dispersion. So the necessary ink backflow amount is determined from the still time. Since the functional recovery operation can be carried out with a minimum backflow amount, the functional recovery operation can be performed efficiently.

In this invention, it is preferred that the apparatus further comprises liquid level sensors disposed in two locations on the supply pipe adjacent the inkjet head and adjacent the pump; wherein the controller is configured to perform the backward drive in time of functional recovery operation in order to allow the gas-liquid interface of the ink in the supply pipe to settle between the liquid level sensors in the two locations.

In time of functional recovery operation, the controller provides the backward drive so that the gas-liquid interface of the ink in the supply pipe may settle between the liquid level sensors in the two locations. Consequently, there is no possibility of bubbles mixing in the ink or the backward drive being done to excess. Thus, the functional recovery operation can be carried out reliably.

In this invention, it is preferred that the pump is a tube pump including an elastic tube with one end thereof connected to an upstream portion of the supply pipe, and the other end connected through a U-shaped portion to a downstream portion of the supply pipe, a plurality of rollers for pressing an inner circumference side of the tube from a center of the U-shaped portion to an outer circumferential side, and a rotating element for rotating the plurality of rollers.

When the rotating element of the tube pump is rotated in one direction, the forward drive of the tube pump is effected. When the rotating element of the tube pump is rotated in the other direction, the backward drive of the tube pump is effected. The printing operation and functional recovery operation can therefore be carried out without switching a check valve or switch valve. This realizes a simplified construction to attain the object at low cost.

In this invention, it is preferred that the pump engaging in the backward drive causes ingredients of the film captured by the filter to re-disperse in the ink stored in the supply pipe to be used in the printing.

Since the ingredients of the ink are re-dispersed in the ink within the supply pipe, property changes of the ink can be suppressed. As a result, there occurs no adverse influence due to the property changes of the ink, whereby the same quality in printing can be maintained over a long period of time.

This invention also provides a method of maintaining a filter of an inkjet printing apparatus which performs printing on a printing medium by feeding ink with a pump from an ink tank to an inkjet head through the filter, and dispensing the ink from the inkjet head to the printing medium, the method comprising the following step: a functional recovery operation step for operating the pump to engage in backward drive for feeding the ink from downstream of the pump backward through the filter to the tank, to re-disperse ingredients of the ink captured in an upstream portion of the filter for use in the printing and for improving choking of the filter.

According to this invention, the functional recovery operation step operates the pump to engage in backward drive, thereby re-dispersing the ingredients of the ink captured in the upstream portion of the filter for use in printing, and for improving the choking of the filter. This can reduce operation cost due to changing of the filter. As a result, the filter can be used to the best advantage for its intrinsic purpose of removing particles that do not contribute to image formation, but cause choking of the head. Further, since the ingredients of the ink are re-dispersed in the ink within the supply pipe, property changes of the ink can be suppressed. As a result, there occurs no adverse influence due to the property changes of the ink, whereby the same quality in printing can be maintained over a long period of time.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

DESCRIPTION OF THE PREFERRED EMBODIMENTS

Embodiments of inkjet printing apparatus will be described hereinafter.

Embodiment 1

Embodiment 1 of this invention will be described hereinafter with reference to the drawings.

Figure 1:
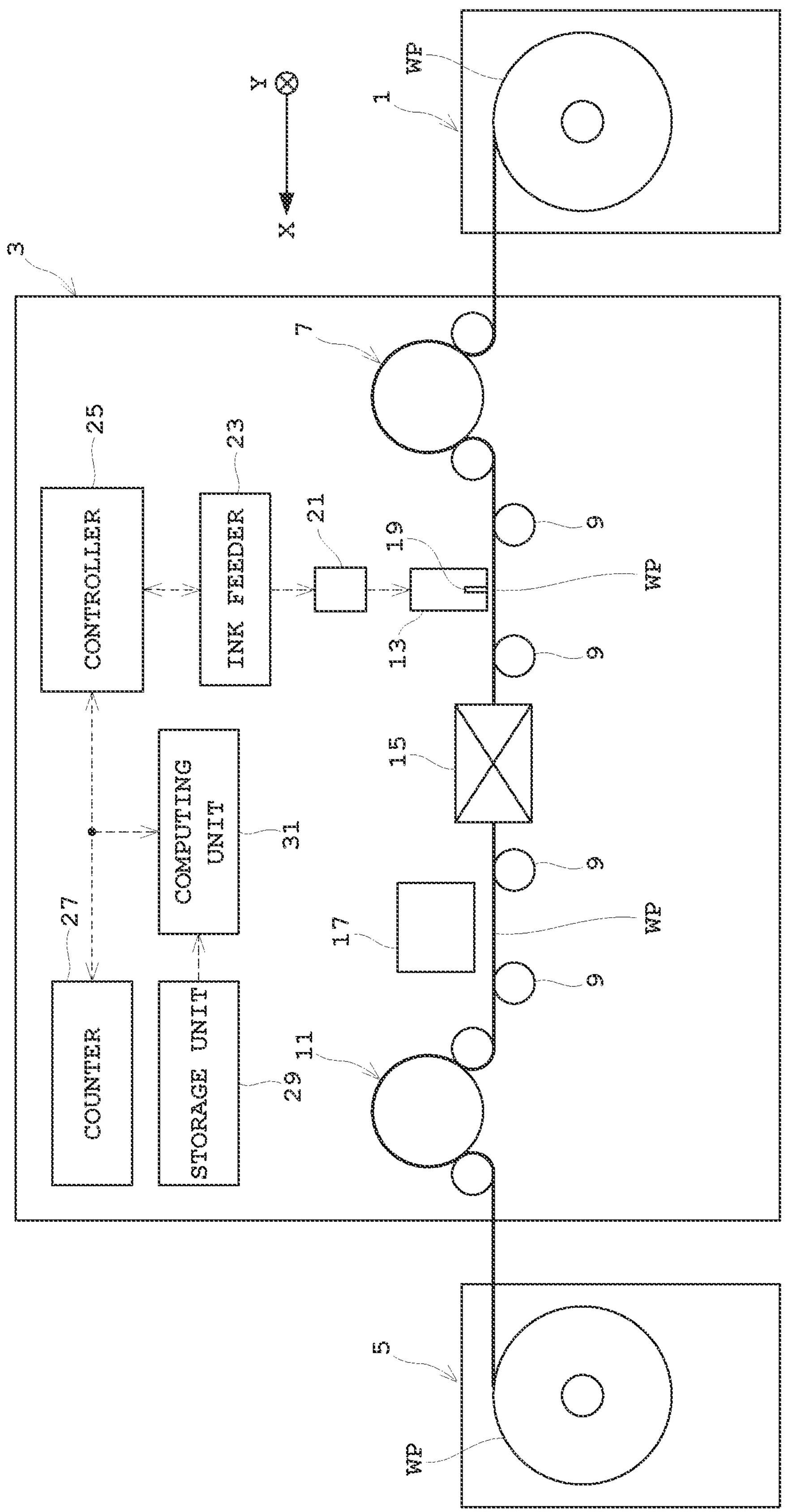
FIG. 1 is a schematic overall view of an inkjet printing system according to Embodiment 1.

FIG. 1 is a schematic overall view of an inkjet printing system according to Embodiment 1.

The inkjet printing system according to Embodiment 1 includes a sheet feeder 1, an inkjet printing apparatus 3, and a takeup roller 5. The sheet feeder 1 holds web paper WP in a roll form to be rotatable about a horizontal axis. The sheet feeder 1 unwinds the web paper WP and feeds it to the inkjet printing apparatus 3. The inkjet printing apparatus 3 prints images by dispensing ink to the web paper WP, and feeds the web paper WP to the takeup roller 5. The takeup roller 5 winds on a horizontal axis the web paper WP printed in the inkjet printing apparatus 3.

Here, the direction in which the web paper WP is fed by the sheet feeder 1 and transported is regarded as transport direction X. A horizontal direction perpendicular to the transport direction X is regarded as width direction Y. The above sheet feeder 1 is located upstream of the inkjet printing apparatus 3 in the transport direction X. The above takeup roller 5 is located downstream of the inkjet printing apparatus 3 in the transport direction X.

The inkjet printing apparatus 3 includes a drive roller 7 disposed in an upstream position for taking in the web paper WP from the sheet feeder 1. The web paper WP unwound from the sheet feeder 1 by the drive roller 7 is fed in the transport direction X and transported toward the takeup roller 5 by a plurality of transport rollers 9. A drive roller 11 is disposed between the most downstream transport roller 9 and the takeup roller 5. This drive roller 11 feeds the web paper WP transported on the transport rollers 9 forward toward the takeup roller 5.

The inkjet printing apparatus 3 includes, between the drive roller 7 and drive roller 11, a printing unit 13, a drying section 15, and an inspecting device 17 arranged in the stated order from upstream. The printing unit 13 performs printing on the web paper WP. The drying section 15 dries the web paper WP printed by the printing unit 13. In the case of inkjet apparatus that uses UV ink, the drying section 15 includes a UV lamp or UV-LED. In the case of inkjet apparatus that uses water-based ink, the drying section 15 includes a heat roller and/or a hot air machine. The inspecting device 17 checks whether portions printed on the web paper WP have stains, omissions or other defects.

The printing unit 13 includes an inkjet head 19 having a plurality of nozzles for dispensing the ink to the web paper WP. Generally, a plurality of inkjet heads 19 are arranged along the transport direction X of the web paper WP. For example, four printing units 13 are provided for black (K), cyan (C), magenta (M), and yellow (Y). In the following description, however, a construction having only one printing unit 13 will be taken for example. The printing unit 13 has a length in the width direction Y of the web paper WP that exceeds the width of the web paper WP. The printing unit 13 has the inkjet head 19 that can print on a printing area in the width direction of the web paper WP without moving in the width direction Y. The inkjet head 19 is supplied with the ink through a subtank 21 from an ink feeder 23.

The inkjet printing apparatus 3 includes a controller 25 for performing overall control of the drive rollers 7 and 11, printing unit 13, drying section 15, inspecting device 17, and ink feeder 23. The controller 25 has, directly or indirectly connected thereto, a counter 27, a storage unit 29, and a computing unit 31. The controller 25 is constructed of a CPU and memory, for example. The counter 27 measures, for example, time when the inkjet printing apparatus 3 suspends a printing process. The storage unit 29 stores a relationship between still time and backflow amount which will be describe in detail hereinafter. The computing unit 31, based on the time measured by the counter 27 and the relationship between still time and backflow amount, performs mathematical operations for determining an operating time of backward drive for operating the ink feeder 23.

The above web paper WP corresponds to the "printing medium" in this invention.

Figure 2:
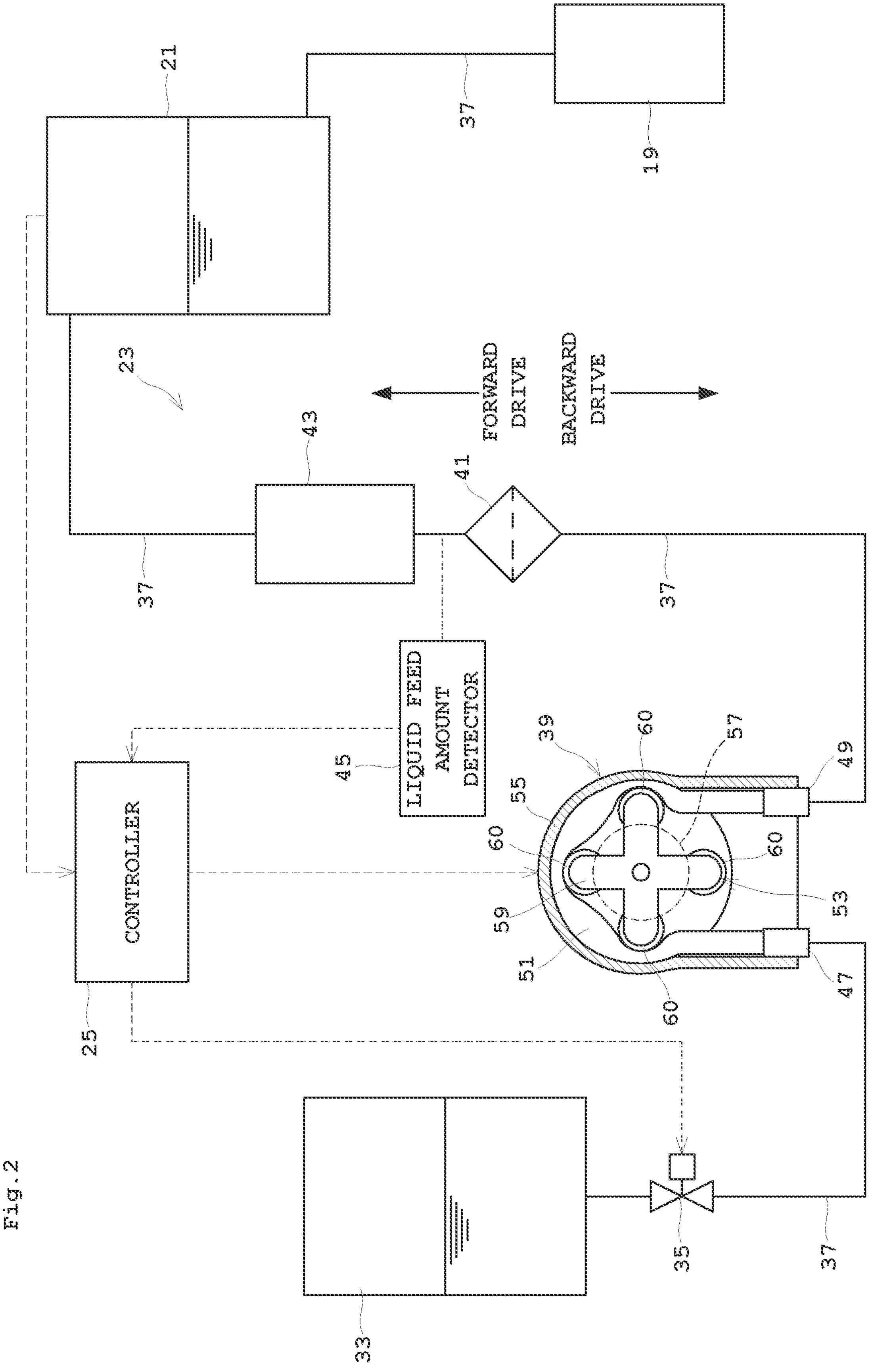
FIG. 2 is a block diagram of an ink feeder in the inkjet printing system according to Embodiment 1.

The ink feeder 23 will now be described with reference to FIG. 2. FIG. 2 is a block diagram of the ink feeder 23 in the inkjet printing system according to Embodiment 1.

The ink feeder 23 includes a main tank 33, a switch valve 35, a supply pipe 37, a pump 39, a filter 41, a degassing filter 43, and a liquid feed amount detector 45.

The main tank 33 is a receptacle that stores ink. The operator of this apparatus replenishes the main tank 33 with ink at appropriate times. The switch valve 35 opens and closes under control of the controller 25. The switch valve 35 permits or blocks circulation of the ink through the supply pipe 37. The supply pipe 37 communicatively connects the main tank 33 and inkjet head 19. The supply pipe 37 serves as passage of the ink.

The pump 39 feeds under pressure the ink present in the main tank 33 and supply pipe 37. This pump 39 preferably is a tube pump (also called a roller pump, peristaltic pump, and tubing pump). The pump 39 has an inlet 47, an outlet 49, a tube 51, a rotating element 53, a housing 55, and a motor 57.

The inlet 47 and outlet 49 are connected to the supply pipe 37 for communication therewith. The inlet 47 and outlet 49 are connected to opposite ends of the tube 51. The inlet 47 is connected to an upstream portion of the supply pipe 37 as seen in time of normal ink feeding operation of the pump 39. The time of normal ink feeding operation is a time of printing operation, for example, and it refers to an operation for feeding the ink from the main tank 33 toward the inkjet head 19.

The outlet 49 is connected to a downstream portion of the supply pipe 37 as seen in time of normal ink feeding operation of the pump 39. The tube 51 is made into a U-shape and connects the inlet 47 and outlet 49. The tube 51 is formed of an elastic body. Therefore, when the tube 51 is pressed from outside, its flow passage cross-section area will be reduced. When the pressure is removed, it will return to a usual flow passage cross-section area. The tube 51 has the rotating element 53 located centrally of the U-shape. The tube 51 is fitted in the housing 55 so that its U-shaped outer circumferential surface may extend along and in contact with an inner circumferential surface of the housing 55. The rotating element 53 has a cross-shaped rotating frame 59 and a plurality of rollers 60. Each roller 60 is rotatably attached to one distal end of the rotating frame 59.

The rotating element 53 rotates with each roller 60 pressing on the inner circumferential surface of the tube 51 toward the outer circumferential surface, thereby squeezing and diminishing the flow passage cross-section area of the tube 51. This rotating operation in one direction of the rotating element 53 feeds the ink in the tube 51 from the inlet 47 to the outlet 49. A rotating operation in the other direction of the rotating element 53 feeds the ink in the tube 51 from the outlet 49 to the inlet 47. The rotating element 53 is driven to rotate by the motor 57. The motor 57 has its direction of rotation and rotating speed controlled by the controller 25.

The above pump 39 is capable of continuous liquid feeding, and is therefore suitable for feeding a large amount of ink. With this pump 39, the rotational frequency of the rotating element 53 and the flow rate are basically proportional. When the rotational frequency of the rotating element 53 is constant, the flow rate will also become constant. This provides an advantage of facilitating a fixed quantity liquid delivery.

The filter 41 is mounted on a portion of the supply pipe 37 downstream of the pump 39 as seen in time of normal ink feeding operation. The filter 41 is provided for removing particles mixed into the ink which do not contribute to image formation but can cause choking of the inkjet head 19. However, this filter 41 will capture part of the ingredients of the ink included in the main tank 33.

The ink is composed of ingredients such as pigment, dispersant, stabilizer, and so on, which are present in a dispersed state. Particularly pigment and monomer among these ingredients can be loosely flocculated in the ink. Then, the pigment and monomer will form larger flocculated masses than when in the dispersed state. The filter 4 may capture the flocculated masses of the ink ingredients rather than the particles which should intrinsically be removed, and get blocked by these masses together with the particles. In this embodiment, the filter 41 is attached to the supply pipe 37 in a position for allowing the ink to flow upward from below during the normal ink feeding operation. Consequently, at a time of backward drive which will be described hereinafter, the filter 41 will easily release the captured masses, with gravity also acting on the masses.

The degassing filter 43 is mounted on a portion of the supply pipe 37 downstream of the filter 41 as seen in time of normal ink feeding operation. The degassing filter 43 removes bubbles included in the ink flowing through the supply pipe 37. When bubbles are included in the ink, there is a possibility of a fault that the ink is not dispensed appropriately from the inkjet head 19. Since this degassing filter 43 removes even bubbles included in the ink, printing is performed with high quality.

The subtank 21 is mounted on a portion of the supply pipe 37 downstream of the degassing filter 43 as seen in time of normal ink feeding operation. The subtank 21 has a level sensor (not shown) installed therein. When the amount of ink in the subtank 21 falls below a fixed value as a result of consumption of the ink at the inkjet head 19, the controller 25 will detect this and supply the ink from the main tank 33 to bring the amount of ink in the subtank 21 back to the fixed value.

The liquid feed amount detector 45 is disposed between the filter 41 and degassing filter 43. This liquid feed amount detector 45 detects the amount of ink that flows through the supply pipe 37.

The main tank 33 noted above corresponds to the "tank" in this invention.

Reference is made back to FIG. 1. The counter 27 measures a time the ink flow stands still in the supply pipe 37. Specifically, the controller 25 operates the counter 27 to start measuring time at a point of time the liquid feed amount detector 45 shows zero liquid feed amount. And at a point of time the liquid feed amount exceeds zero again, the controller 25 operates the counter 27 to reset the time measurement.

Figures 3, 4:
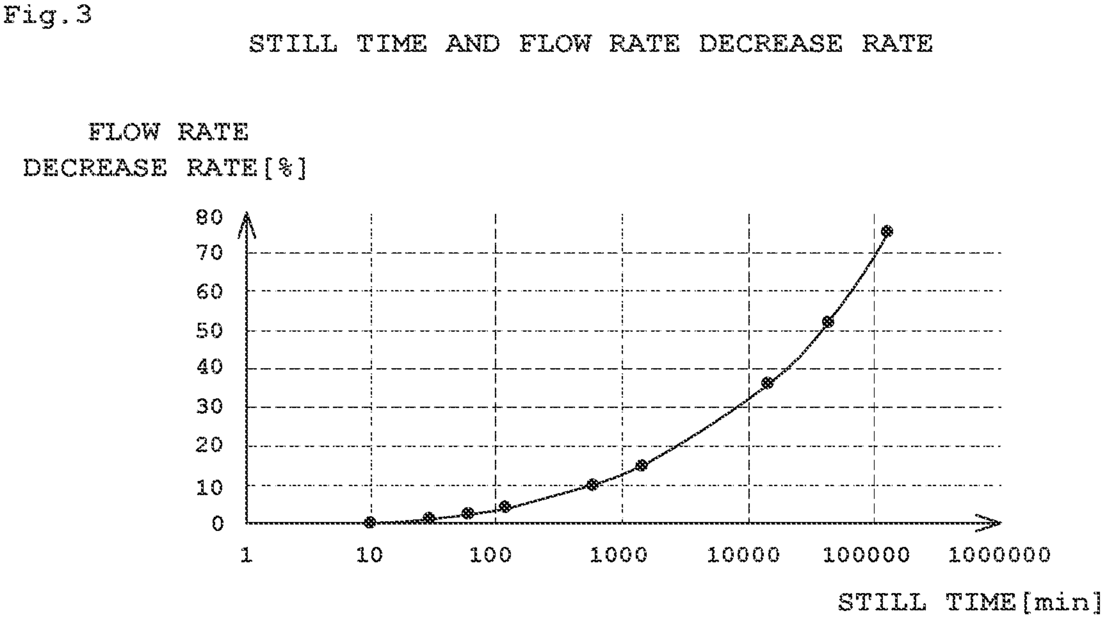
FIG. 3 is a graph showing a relationship between still time and flow rate decrease rate.
FIG. 4 is a table showing a relationship between still time and backflow amount, FIG. 5A schematically shows a state of a filter at a time of printing operation, FIG. 5B schematically shows a state of the filter at a time of functional recovery operation, FIG. 5C schematically shows a state of the filter after a functional recovery process.
Figure 5A:
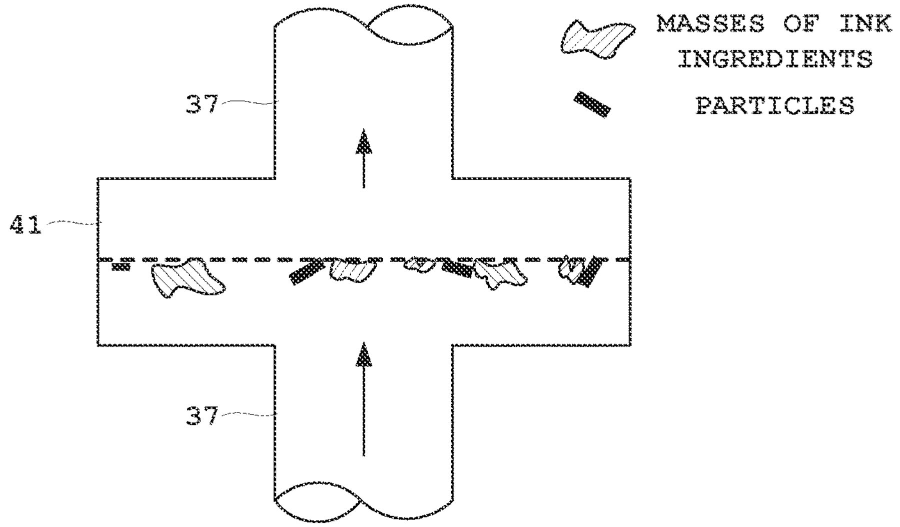
Figure 5B:
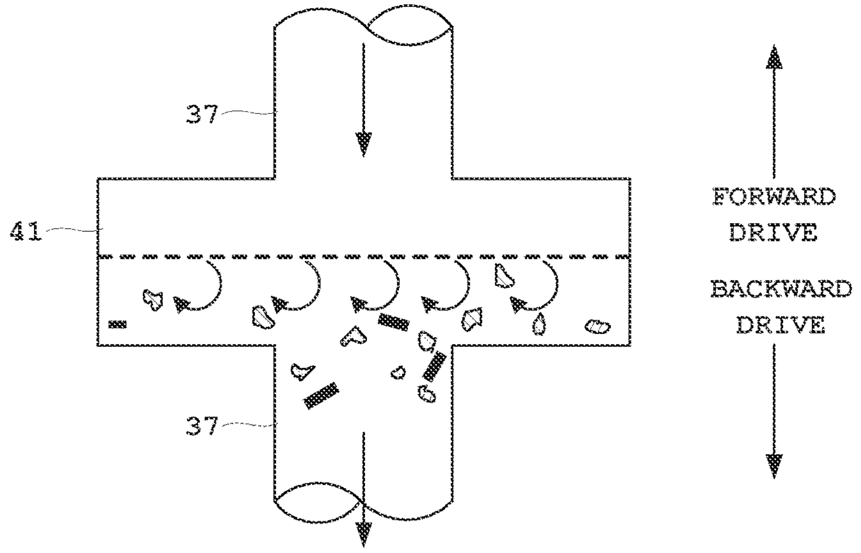
Figure 5C:
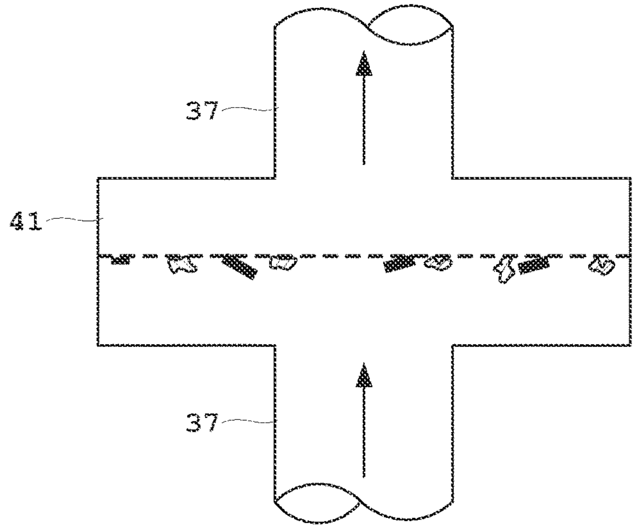

The storage unit 29 will be described. Reference is made here to FIGS. 3 to 5. FIG. 3 is a graph showing a relationship between still time and flow rate decrease rate. FIG. 4 is a table showing a relationship between still time and backflow amount. FIG. 5A schematically shows a state of the filter in time of printing operation. FIG. 5B schematically shows a state of the filter in time of functional recovery operation. FIG. 5C schematically shows a state of the filter after a functional recovery process, Here, an elapsed time in a state where the ink feed amount is zero is regarded as a still time. FIG. 3 shows one example of relationship between the still time and a flow rate decrease rate indicating a rate of decrease of flow rate due to choking of the filter 41. As seen from FIG. 3, when the still time increases, the flow rate decrease rate will increase. Specific numerical values of the still time and flow rate decrease rate at this time are shown in FIG. 4. The fact that when the still time increases, the flow rate decrease rate will increase, is especially because, the longer becomes the still time in which the ink does not flow, part of the pigment and monomer which should be dispersed in the ink will be the more likely to flocculate loosely. And it is a main cause that the pigment and monomer having flocculated into large masses are captured by the filter 41.

The ink will be consumed when the apparatus operates to dispense the ink from the inkjet head 19 to the web paper WP. Then, as shown in FIG. 5A, the filter 41 captures the particles having mixed into the ink and the masses of part of the ingredients in the ink having loosely flocculated. Consequently, the filter 41 undergoes a pressure loss which decreases the flow rate of the ink passing through the filter 41. When the flow rate immediately after changing of the filter 41 is set to 100, and thereafter the still time for suspending the ink feeding increases, the flow rate decrease rate of the ink will increase.

Inventors have done an experiment on what amount of ink should be made to flow backward through the filter 41 in order to resolve the choking of the filter 41 when the flow rate lowers. As a result, as shown in the backflow amount column in FIG. 4, for example, it has been found that the choking of the filter 41 can be improved by choosing a backflow amount according to the still time. Based on the result, the storage unit 29 stores, written in beforehand, data showing a relationship between the still time and backflow amount. When the apparatus is started, or when the printing process of a printing job is restarted from a state where the printing job is stopped, the controller 25 reads a still time occurring on that occasion from the counter 27. Next, the controller 25 gives the read still time to the computing unit 31. The computing unit 31 calculates a backflow amount based on the still time received and the relationship between the still time and backflow amount in the storage unit 29. The backflow amount calculated by the computing unit 31 is given to the controller 25. The controller 25 operates the pump 39 to realize the backflow amount received from the computing unit 31.

The controller 25 operates the pump 39, and there are the following two types of operation. That is, the two types are forward drive in a printing operation, and backward drive in a functional recovery operation.

The forward drive is driving of the pump 39 to feed the ink to the inkjet head 19 through the supply pipe 37 in a normal way, that is to feed the ink from the main tank 33 through the filter 41 to the inkjet head 19. The backward drive is driving of the pump 39 to feed the ink in a direction opposite to the ink flowing direction for feeding the ink in time of forward drive. To define the backward drive in other words, the pump 39 is operated in the direction for returning the ink to the main tank 33 so that the ink may flow backward in the filter 41.

Then, in the filter 41, as shown in FIG. 5B, the particles and the masses of ink ingredients captured in the upstream side of the filter 41 are moved back upstream in the filter 41, riding on the ink flow, thereby to be agitated. Consequently, the materials captured in the filter 41 are washed away into the ink in the portion of the supply pipe 47 upstream of the filter 41. This substantially eliminates the pressure loss in the filter 41. FIG. 5C shows this state.

When the apparatus starts up, the controller 25, as described hereinafter, determines whether or not the functional recovery operation is necessary. Further, the controller 25, while performing a printing process, checks whether or not the liquid feed amount is below a threshold, based on a relationship between operation amount of the pump 39 and liquid feed amount detected by the liquid feed amount detector 45. This is done in order to determine, while performing the printing process, whether the filter 41 is choked or not. A liquid feed amount short of the operation of the pump 39 means that a choke has occurred to the filter 41. A determination is therefore made with reference to the threshold on whether or not the liquid feed amount is short of what it should be relative to the operation amount of the pump 39. It is preferable that the controller 25 determines based on the still time whether or not the functional recovery operation is necessary, at a point of time when the ink flow through the filter 41 is changed from suspension to resumption during operation of the apparatus, and at a point of time when the apparatus starts up.

Figure 6:
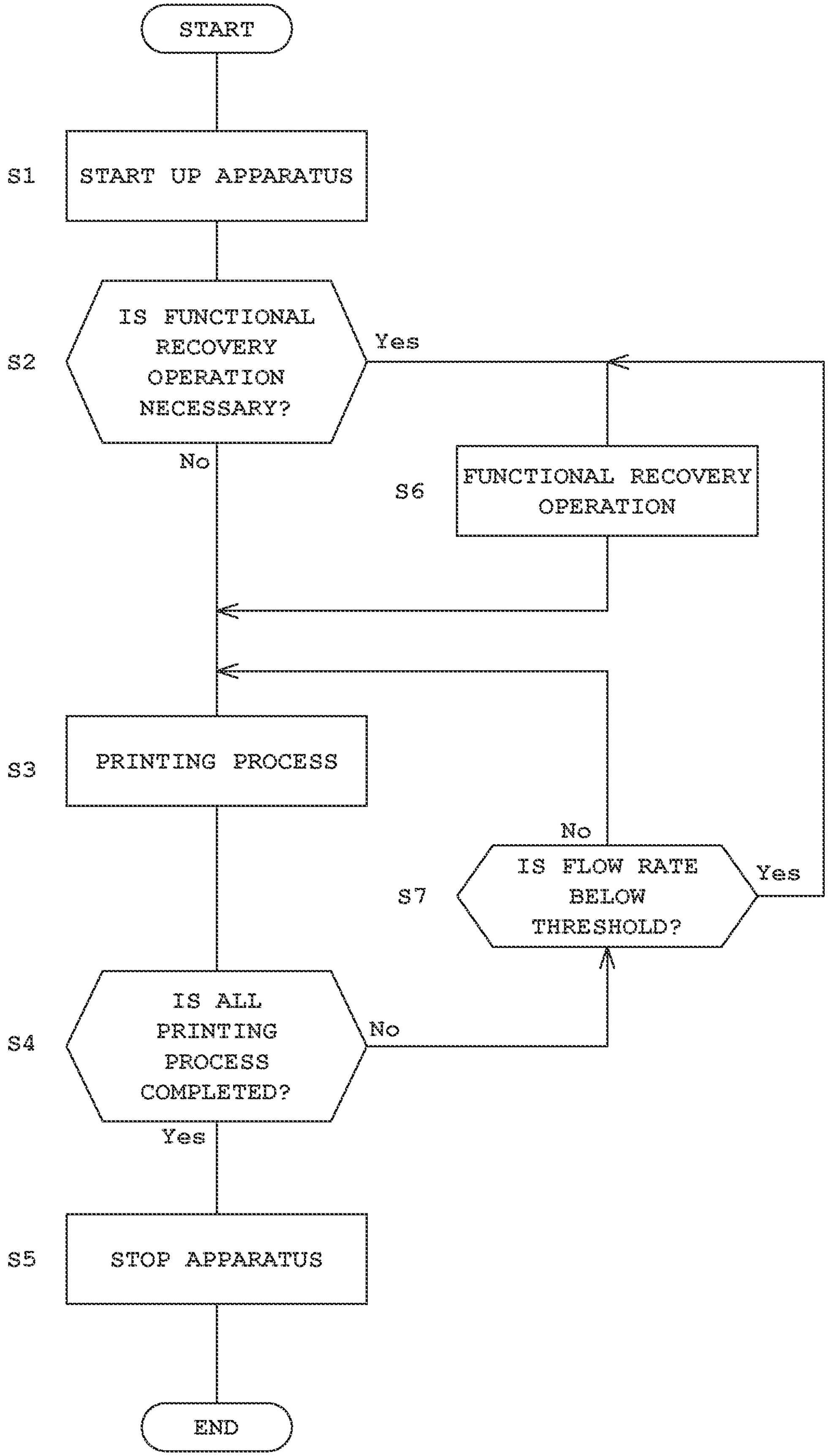
FIG. 6 is a flow chart showing a processing sequence.

Next, an operation of the inkjet printing system having the above construction will be described with reference to FIG. 6. FIG. 6 is a flow chart showing a processing sequence.

Step S1

The apparatus is started up. That is, the power source of the apparatus is turned on for enabling the inkjet printing system to execute a printing process.

Step S2

The process is branched depending on whether or not a functional recovery operation is necessary. Specifically, the controller 25 reads a measured time of the counter 27 and gives it to the computing unit 31. The computing unit 31 calculates a backflow amount based on the relationship between still time and backflow amount in the storage unit 29, and the measured time corresponding to the still time. The calculated backflow amount is given to the controller 25. The controller 25 determines from the backflow amount whether or not the functional recovery operation is necessary. If the backflow amount is 0, for example, it is not necessary to execute the functional recovery operation. On the other hand, if the backflow amount exceeds 0, the functional recovery operation is determined necessary.

Whether or not a functional recovery operation is necessary may be determined only from the still time. Further, a functional recovery operation may certainly be executed in time of startup of the apparatus without determining whether the functional recovery operation is necessary. This can shorten time until a shift is made to the printing operation.

Step S3

Assume here that the functional recovery operation is unnecessary. The controller 25 carries out forward drive of the pump 39 for the printing operation. Specifically, the controller 25 opens the switch valve 35 and operates the pump 39 to feed the ink from the main tank 33 to the inkjet head 19. This operation is performed according to the ink storage capacity of the subtank 21.

Step S4

The process is branched depending on whether or not all the printing process is completed.

Step S5 The apparatus is stopped if all the printing process is completed. Consequently, the counter 27 begins to measure a still time of the apparatus.

Here, description will be made of the case where the functional recovery process is determined necessary in the above step S2.

Step S6 (Functional Recovery Operation Step)

The controller 25 executes the functional recovery process.

Specifically, the pump 39 is driven backward. Consequently, the ink flows through the filter 41 in the direction opposite to the time of printing operation. This improves the choking of the filter 41. When part of the ingredients of the ink are captured as masses by the filter 41, the part of the ingredients of the ink will disperse in the ink again. When back-driving the pump 39, it is preferable that, in the portion of the supply pipe 37 connecting the subtank 21 and degassing filter 43, a gas-liquid interface of the ink is located adjacent the subtank 21 rather than the degassing filter 43. That is, the pump 39 is driven backward so that the gas-liquid interface of the ink may not be located inside the degassing filter 43. Although the controller 25 conducts the functional recovery process with the backflow amount calculated from the still time, when the gas-liquid interface of the ink is located adjacent the subtank 21 rather than the degassing filter 43, the calculated backflow amount alone may not be able to realize the ink backflow. In that case, what is necessary is to repeat the backward drive and forward drive of the pump 39 a plurality of times in order to gain the backflow amount.

Step S7 will be described, which is executed when one printing job is completed and whether or not all printing process is determined in the above step S4, and before printing in the next printing job is performed.

Step S7

The controller 25 checks for choking of the filter 41 when one printing job is completed and before shifting to the next printing job. Specifically, during the printing process in step S3, the controller 25 determines with reference to the threshold whether or not the liquid feed amount is short of what it should be relative to the operation amount of the pump 39. When the liquid feed amount is less than the threshold, the operation returns to step S6 to carry out the functional recovery process noted above. On the other hand, when the liquid feed amount is larger than the threshold, a determination is made that the situation is normal, and a shift is made to step S3 to perform the printing process of the next printing job.

Instead of executing step S7 for every printing job, it may be executed for every two or more printing jobs, or every predetermined time elapse of the printing process. There are types of prints that consume less ink than others. In such a case, the amount of ink flow through the supply pipe 37 can easily decrease even during a printing process. Then, there is a possibility that the ingredients of the ink flocculate even during the printing process. Choking of the filter 41 thereby occurring during the printing process can easily be detected by executing step S7 every predetermined time.

According to this embodiment, the controller 25 provides the forward drive of the pump 39 in time of printing operation. The controller 25 provides the backward drive of the pump 39 in time of functional recovery operation. This feature can re-disperse, in the ink within the supply pipe 37, the masses of the ingredients of the ink captured by the filter 41 during the printing operation. The choking of the filter 41 can thereby be improved, which can reduce operation cost due to changing of the filter 41. As a result, the filter 41 can be used to the best advantage for its intrinsic purpose of removing particles that do not contribute to image formation, but cause choking of the inkjet head 19.

The controller 25, in time of functional recovery operation, provides the backward drive until the gas-liquid interface of the ink in the portion of the supply pipe 37 adjacent the inkjet head 19 is located on the side of the degassing filter 43 adjacent the inkjet head 19. Consequently, the gas-liquid interface of the ink is not located in the degassing filter 43. The degassing filter 43 can therefore remain filled with the ink during the functional recovery operation. This prevents bubbles mixing into the ink.

Further, the controller 25, in time of functional recovery operation, repeats the forward drive and backward drive a plurality of times. Consequently, the ink in the supply pipe 37 can fully be agitated through the filter 41. The masses of the ingredients of the ink captured by the filter 41 can therefore be re-dispersed reliably.

The controller 25 back-drives the pump 39 according to the backflow amount calculated by the computing unit 31. Thus, there is no need to back-drive the pump 39 more than necessary. The functional recovery operation can be done with a minimum amount of backflow. The functional recovery operation can therefore be performed efficiently.

Embodiment 2

Next, Embodiment 2 of this invention will be described with reference to the drawing.

Figure 7:
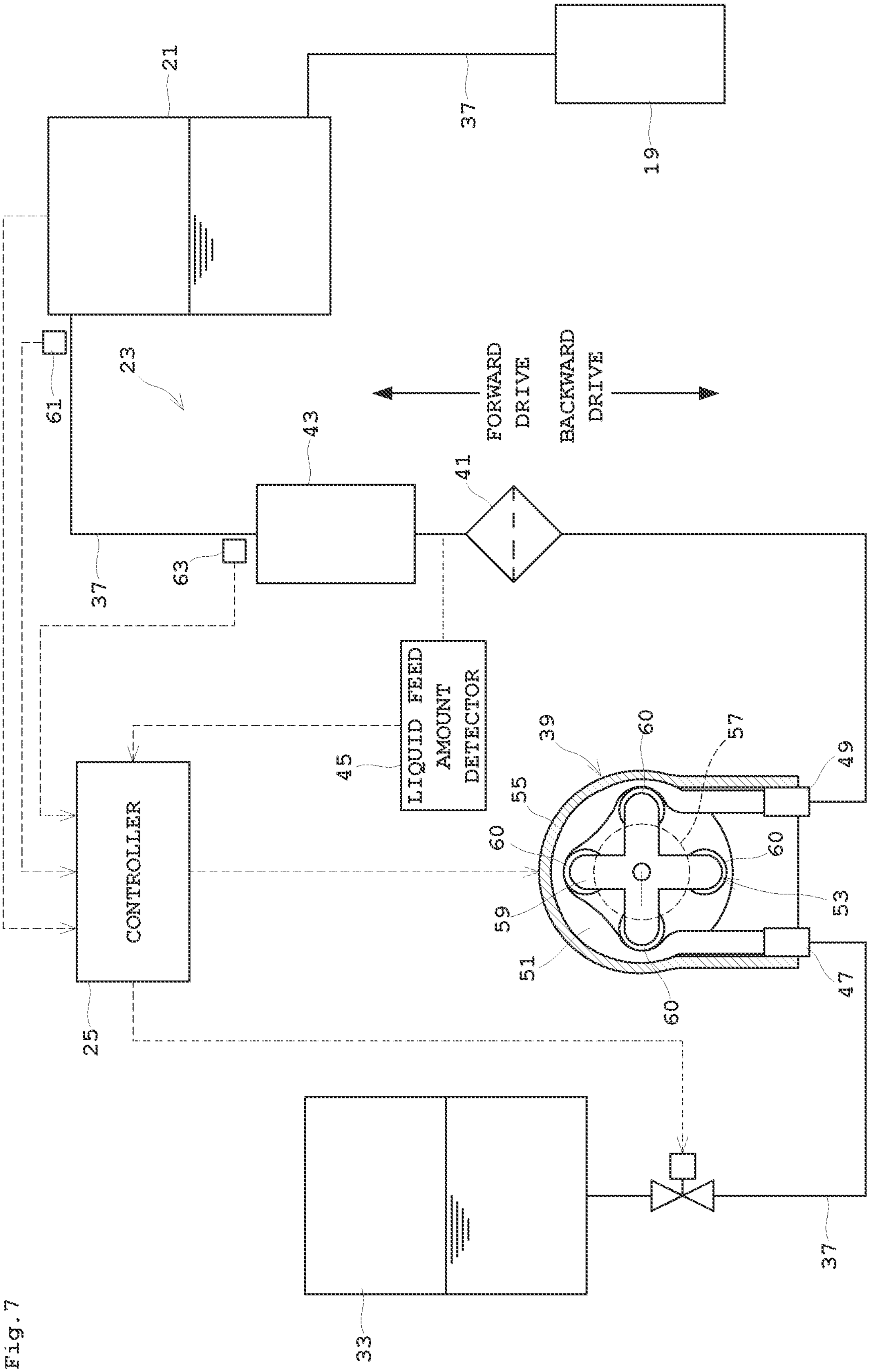
FIG. 7 is a block diagram of an ink feeder in an inkjet printing system according to Embodiment 2.

FIG. 7 is a block diagram of an ink feeder in an inkjet printing system according to Embodiment 2. Components identical to those of Embodiment 1 are shown with the same signs, and will not particularly be described.

In Embodiment 2, a first sensor 61 and a second sensor 63 are attached to the supply pipe 37 of the ink feeder 23. Specifically, the first sensor 61 is attached to the portion of the supply pipe 37 between the degassing filter 43 and subtank 21, and is disposed adjacent the subtank 21. The second sensor 63 is disposed in a position on the supply pipe 37 adjacent the degassing filter 43. These first sensor 61 and second sensor 63 detect the gas-liquid interface of the ink present in the supply pipe 37.

In the construction of Embodiment 2, in time of functional recovery process described above, the controller 25 operates to back-drive the pump 39 so that the gas-liquid interface of the ink in the supply pipe 37 may settle between the first sensor 61 and second sensor 63. Consequently, there is no possibility of bubbles mixing in the ink or the backward drive being done to excess. Thus, the functional recovery operation can be carried out reliably.

This invention is not limited to the foregoing embodiments, but may be modified as follows:

(1) Each of Embodiments 1 and 2 described above provides the degassing filter 43 and subtank 21 between the filter 41 and inkjet head 19. However, this invention does not require these components as indispensable.

(2) Each of Embodiments 1 and 2 has been described taking a tube pump as an example of the pump 39. This invention is not limited to this type as the pump 39, but a pump 39 of a different type may be employed. In that case, a switch valve, a check valve, and so on may be included in the supply pipe 37, and the ink flowing directions described hereinbefore may be realized by means of the forward drive and backward drive.

(3) In each of Embodiments 1 and 2 described above, in time of normal ink feeding operation, the pump 39 is located in a position upstream of the filter 41 to intervene between the portions of the pipe 37. However, this invention is not limited to this. That is, in time of normal ink feeding operation, the pump 39 may be located in a position downstream of the filter 41 to intervene between the portions of the pipe 37. In this case also, in time of functional recovery operation, the masses of the ingredients of the ink captured by the filter 41 during printing operations can be re-dispersed in the ink within the supply pipe 37 by back-driving the pump 39. Consequently, the choking of the filter 41 can be improved.

(4) Each of Embodiments 1 and 2 has been described that the forward drive and backward drive are repeated a plurality of times in time of functional recovery process. However, this invention does not necessarily need to repeat the forward drive and backward drive of the pump 39 a plurality times in time of functional recovery process. That is, there is no need to solve the choking of the filter 41 completely by back-driving the pump 39, but what is necessary is just to be able to improve the choking of the filter 41 from a state before the functional recovery operation. Further, in order to aim at achieving the functional recovery to a maximum degree by one-time backward drive, the length of supply pipe 37 between the degassing filter 43 and subtank 21 may be increased.

(5) In each of Embodiments 1 and 2 described above, a determination is made in step S2, after the start-up of the apparatus, whether or not a functional recovery operation is necessary. However, as in step S7, a determination is made whether or not the functional recovery operation should be carried out between the printing processes according to a checking based on the flow rate. This makes it unnecessary to determine whether or not the functional recovery operation is needed at every startup of the apparatus. Conversely, instead of determining between the printing processes whether or not the functional recovery process should be carried out according to the checking based on the flow rate, a determination may be made whether or not the functional time operation is necessary only in time of startup of the apparatus.

(6) In each of Embodiments 1 and 2 described above, step S2 of FIG. 6 checks after a startup of the apparatus whether or not the functional recovery operation is necessary, and step S7 determines in intervals between the printing processes whether or not the functional recovery process should be carried out according to the checking based on the flow rate. However, this invention may carry out the functional recovery operation at regular intervals, without checking or determining whether or not the functional recovery operation is necessary in the first place, or whether or not the functional recovery process is necessity.

That is, the controller 25 may control the pump 39 to carry out the functional recovery operation immediately after feeding the ink to the subtank 21. In this case, immediately after feeding the ink to the subtank 21, the gas-liquid interface of the ink in the supply pipe 37 is located near an inlet port of the subtank 21. Note here that a known amount of ink is present from this position of the gas-liquid interface of the ink to a position adjacent the inkjet head 19 of the degassing filter 43, i.e. an outlet port, not shown, of the degassing filter 43 filled with the ink. So, in executing the functional recovery operation, an amount of ink not exceeding the above known amount of ink may be fed backward.

Further, the controller 25 may control the pump 39 to carry out the functional recovery operation at every fixed time interval, e.g. once every 30 minutes, with the knowledge of the position of the gas-liquid interface of the ink in the supply pipe 37. An increase in the frequency of the functional recovery operation will secure a constantly stable ink feed amount.

(7) In Embodiments 1 and 2 described above, the filter 41 is attached to the supply pipe 37 in a position for allowing the ink to flow upward from below in time of normal use. However, this invention is not limited to such attaching position. That is, the filter 41 may be attached in a position for allowing the ink to flow downward from above, or in a position for allowing the ink to flow horizontally from one side toward the other side.

(8) In Embodiments 1 and 2 described above, the functional recovery process is done only by operating the pump 39. However, the switch valve 35 may also be operated as follows.

That is, when carrying out the functional recovery process, the switch valve 35 is closed first. Then, the pump 39 is back-driven. This raises the pressure of the ink in the interior of supply pipe 37 between the degassing filter 43 and switch valve 35. Subsequently, the switch valve 35 is opened. This releases the pressure in the supply pipe 37 between the degassing filter 43 and switch valve 35 at a stroke. This increases a backward ink flow velocity, thereby facilitating improvement in the choking of the filter 41. The masses formed in the ink can also be re-dispersed in a short time.

This invention may be embodied in other specific forms without departing from the spirit or essential attributes thereof and, accordingly, reference should be made to the appended claims, rather than to the foregoing specification, as indicating the scope of the invention.

What is claimed is:

1. An inkjet printing apparatus for printing on a printing medium by feeding ink to an inkjet head having a plurality of nozzles and dispensing the ink from the inkjet head to the printing medium, the apparatus comprising:

a tank for storing the ink;

a supply pipe communicatively connecting the tank and the inkjet head;

a pump mounted on the supply pipe for feeding the ink stored in the tank to the inkjet head;

a filter disposed on a path of the supply pipe;

a degassing filter mounted on the supply pipe between the pump and the inkjet head and downstream of the filter for removing bubbles from the ink; and a controller configured to:

operate the pump to engage in forward drive for feeding the ink from the tank toward the inkjet head in time of printing operation that causes the inkjet head to dispense the ink fed from the tank; and operate the pump to engage in backward drive for feeding the ink from a position downstream of the pump back to the tank in time of functional recovery operation for improving choking of the filter, the functional recovery operation being performed until an interface between the ink and gas in a portion of the supply pipe adjacent the inkjet head is located on a side of the degassing filter adjacent the inkjet head.

2. The apparatus according to claim 1, wherein the controller is configured to repeat the forward drive and the backward drive a plurality of times in time of functional recovery operation.

3. The apparatus according to claim 2, wherein the controller is configured to provide the backward drive based on a relationship between a still time which is a duration of a state where the ink is not flowing, and an ink backflow amount necessary for re-dispersing ingredients captured by the filter.

4. The apparatus according to claim 1, wherein the controller is configured to provide the backward drive based on a relationship between a still time which is a duration of a state where the ink is not flowing, and an ink backflow amount necessary for re-dispersing ingredients captured by the filter.

5. The apparatus according to claim 1, further comprising liquid level sensors disposed in two locations on the supply pipe adjacent the inkjet head and adjacent the pump;

wherein the controller is configured to perform the backward drive in time of functional recovery operation in order to allow the gas-liquid interface of the ink in the supply pipe to settle between the liquid level sensors in the two locations.

6. The apparatus according to claim 1, wherein the pump is a tube pump including an elastic tube with one end thereof connected to an upstream portion of the supply pipe, and the other end connected through a U-shaped portion to a downstream portion of the supply pipe, a plurality of rollers for pressing an inner circumference side of the tube from a center of the U-shaped portion to an outer circumferential side, and a rotating element for rotating the plurality of rollers.

7. The apparatus according to claim 1, wherein the pump engaging in the backward drive causes ingredients of the ink captured by the filter to re-disperse in the ink stored in the supply pipe to be used in the printing.

8. A method of maintaining a filter of an inkjet printing apparatus which performs printing on a printing medium by feeding ink with a pump from an ink tank to an inkjet head through the filter, and dispensing the ink from the inkjet head to the printing medium, the method comprising:

operating the pump to engage in backward drive in time of functional recovery operation, for feeding the ink from downstream of the pump backward through the filter to the tank, to re-disperse ingredients of the ink captured in an upstream portion of the filter for use in the printing and for improving choking of the filter, wherein the inkjet printing apparatus further comprises a supply pipe communicatively connecting the tank and the inkjet head, and a degassing filter mounted on the supply pipe between the pump and the inkjet head and downstream of the filter for removing bubbles from the ink, and wherein the functional recovery operation is performed until an interface between the ink and gas in a portion of the supply pipe adjacent the inkjet head is located on a side of the degassing filter adjacent the inkjet head.

9. The method according to claim 8, wherein the functional recovery operation step is executed to repeat forward drive and the backward drive a plurality of times, the forward drive operating the pump to feed the ink in the tank toward the inkjet head.

* * * * *